(12) United States Patent
    Subramanian

(10) Patent No.: US 9,311,263 B2
(45) Date of Patent: Apr. 12, 2016

(54) INPUT/OUTPUT SWITCHING MODULE INTERFACE IDENTIFICATION IN A MULTI-SERVER CHASSIS

(71) Applicant: Dell Products L.P., Round Rock, TX (US)

(72) Inventor: Ramesh Balaji Subramanian, TamilNadu (IN)

(73) Assignee: Dell Products L.P., Round Rock, TX (US)

( * ) Notice: Subject to any disclaimer, the term of this patent is extended or adjusted under 35 U.S.C. 154(b) by 400 days.

(21) Appl. No.: 13/899,290

(22) Filed: May 21, 2013

(65) Prior Publication Data
US 2014/0281111 A1    Sep. 18, 2014

(30) Foreign Application Priority Data

Mar. 15, 2013    (IN) .............................. 764/DEL/2013

(51) Int. Cl.
    *G06F 13/40*    (2006.01)
    *G06F 3/06*    (2006.01)
(52) U.S. Cl.
    CPC .......... *G06F 13/4022* (2013.01); *G06F 3/0689* (2013.01); *G06F 2213/0052* (2013.01)
(58) Field of Classification Search
    CPC . G06F 13/385; G06F 13/4022; G06F 3/0689; G06F 2213/0052
    USPC ........................................................ 710/316
    See application file for complete search history.

(56) References Cited

U.S. PATENT DOCUMENTS

| | | | | |
|---|---|---|---|---|
| 7,418,525 B2* | 8/2008 | Dalton | ................... | G06F 1/3209 709/203 |
| 7,577,812 B2* | 8/2009 | Fujibayashi | .......... | G06F 3/0607 711/170 |
| 7,953,835 B2* | 5/2011 | Yoshikawa | ............... | H04L 12/24 709/223 |
| 8,004,997 B2* | 8/2011 | Jovanovich | .......... | G06F 11/2005 370/248 |
| 8,214,467 B2* | 7/2012 | Dake | ................... | H04L 41/0816 370/351 |
| 8,625,592 B2* | 1/2014 | Rajendran | ................ | H04L 45/00 370/392 |
| 8,819,319 B2* | 8/2014 | Shirai | .................... | G06F 13/385 710/104 |
| 8,995,424 B2* | 3/2015 | Shetty | ..................... | H04L 67/10 370/351 |
| 9,032,063 B2* | 5/2015 | Kumbhari | ............. | G06F 9/4415 370/237 |
| 9,042,383 B2* | 5/2015 | Hendel | ................. | H04L 49/358 370/392 |
| 2007/0083723 A1* | 4/2007 | Dey | .................... | G06F 11/2033 711/163 |

* cited by examiner

*Primary Examiner* — Brian Misiura
(74) *Attorney, Agent, or Firm* — Haynes and Boone, LLP

(57) ABSTRACT

An interface identification system includes an IHS enclosure including a plurality of IHS slots and a plurality of input/output (I/O) switching module slots. A connection plane provides interconnects between the plurality of IHS slots and the plurality of I/O switching module slots. An I/O switching module includes a plurality of interfaces. The I/O switching module may be coupled to a first I/O switching module slot and, in response, retrieve first I/O switching module slot information about the first I/O switching module slot, retrieve IHS information about IHSs located in the plurality of IHS slots that are interconnected with the first I/O switching module slot through the connection plane, and use the first I/O switching module slot information and the IHS information to identify each of the plurality of interfaces on the I/O switching module that is coupled to an IHS by that IHS and the first I/O switching module slot.

17 Claims, 7 Drawing Sheets

INPUT/OUTPUT SWITCHING MODULE INTERFACE IDENTIFICATION IN A MULTI-SERVER CHASSIS

CROSS-REFERENCE

This application claims priority to Indian Patent Application No. 764/DEL/2013, filed on Mar. 15, 2013, and entitled "Input/Output Switching Module Interface Identification In A Multi-Server Chassis," the entire disclosure of which is hereby incorporated herein by reference.

BACKGROUND

The present disclosure relates generally to information handling systems, and more particularly to the identification of input/output switching module interfaces in a chassis housing multiple information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and use requirements and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some situations, multiple IHSs such as, for example, blade server IHSs, may be housed in an IHS enclosure such as a blade enclosure. Such IHS enclosures include mid-planes or backplanes that are used to couple the IHSs to Input/Output (I/O) switching modules that allow data transmission to and from the IHSs. Specifically, the IHSs may be coupled to internal interfaces on different I/O switching modules, and the I/O switching modules transmit data from their internal interfaces to external interfaces on the I/O switching module. For example, some I/O switching modules may include 32 internal 10G interfaces, each of which may be connected to a respective IHS, along with 2 external 40G interfaces. The identification of these internal interfaces can raise a number of issues.

Traditionally, I/O switching modules identify their internal interfaces generically such that an I/O switching module with 32 internal 10G interfaces, each connected to a respective IHS, might identify those internal interfaces as TenGigabitEthernet 0/1, TenGigabitEthernet 0/2, . . . and up to TenGigabitEthernet 0/32 if each interface is connected to an IHS. In a standalone switch, such generic identification of interfaces does not raise an issue, as the interfaces to server mapping in such a scenario is relatively straight forward. However, in multi-server IHS enclosures, several I/O switching modules may be employed. In such scenarios, the generic identification of internal interfaces makes the determination of which IHSs each I/O switching module interface is connected to complicated, and requires a detailed chart that maps each IHS to its connected interface. Thus, when a user wishes to configure a particular interface for a particular IHS, they must consult the chart, and when configuring multiple interfaces per IHS, such operations can become confusing very quickly.

Accordingly, it would be desirable to provide for the improved identification of input/output switching module interfaces in a chassis housing multiple information handling systems.

SUMMARY

According to one embodiment, an interface identification system includes an information handling system (IHS) enclosure including a plurality of IHS slots and a plurality of input/output (I/O) switching module slots; a connection plane providing interconnects between the plurality of IHS slots and the plurality of I/O switching module slots; and an I/O switching module that includes a plurality of interfaces and that is operable to be coupled to a first I/O switching module slot of the plurality of I/O switching module slots and, in response, retrieve first I/O switching module slot information about the first I/O switching module slot, and retrieve IHS information about one or more IHSs located in the plurality of IHS slots that are interconnected with the first I/O switching module slot through the connection plane, wherein the I/O switching module is operable to use the first I/O switching module slot information and the IHS information to identify each of the plurality of interfaces on the I/O switching module that is coupled to an IHS by that IHS and the first I/O switching module slot.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
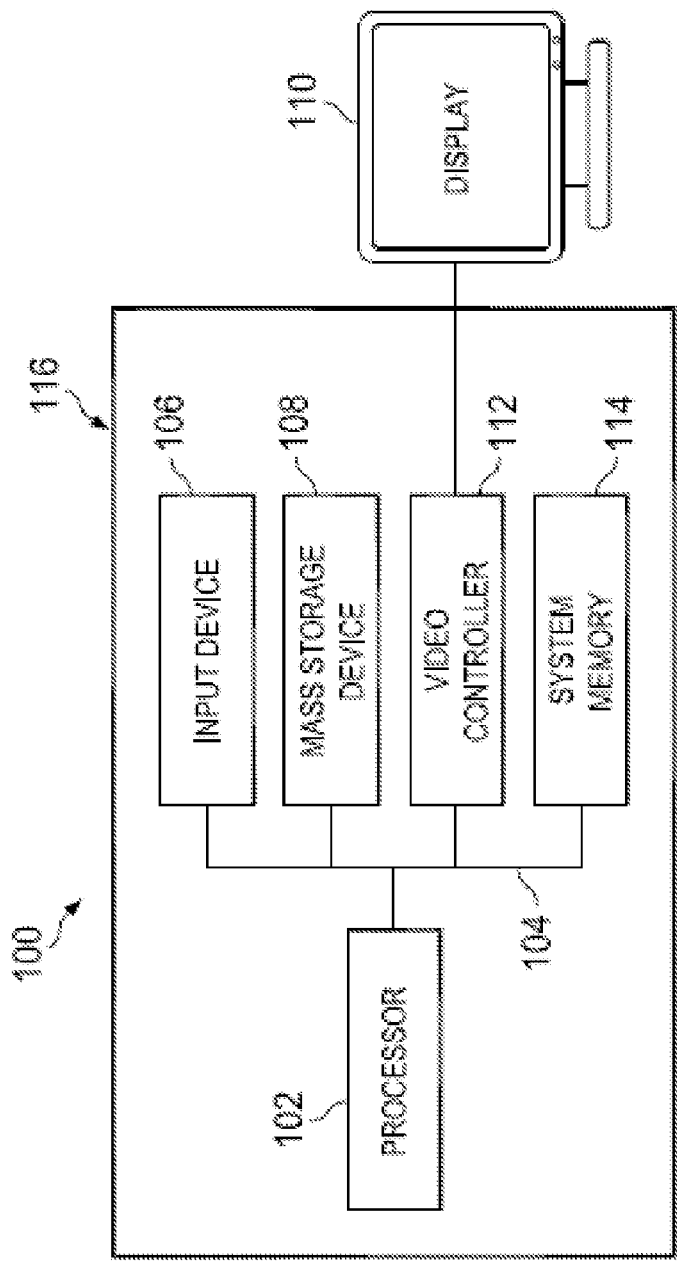
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
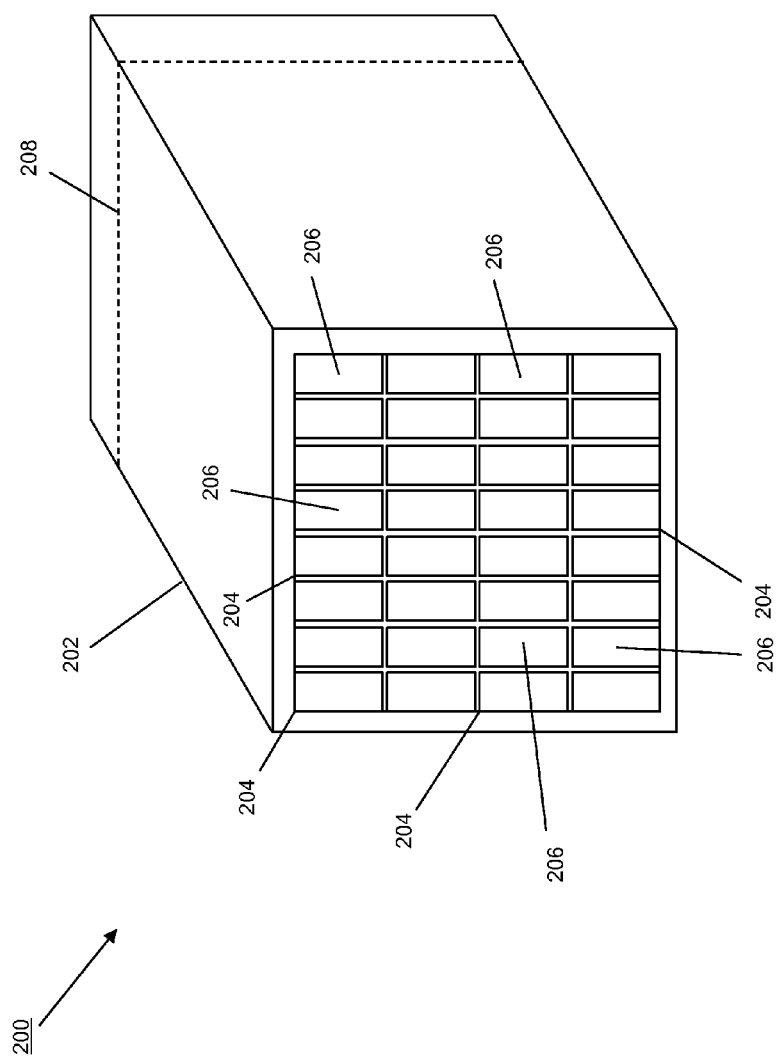
FIG. 2 is a perspective view illustrating an embodiment of an IHS enclosure.

Referring now to FIG. 2, an embodiment of an IHS enclosure 200 is illustrated. In an embodiment, the IHS enclosure 200 may be a PowerEdge® M1000e module enclosure available from Dell, Inc. The IHs enclosure 200 includes a chassis 202 that defines a plurality of IHSs slots 202, each of which may house an IHS 206 that may include some or all of the components of the IHS 100, discussed above with reference to FIG. 1. For example, the IHS enclosure 200 may be a server enclosure, and the IHSs 206 may be servers. In the illustrated embodiment, the IHSs 206 are illustrated as 32 quarter-height servers, but one of skill in the art will recognize that different combinations of servers including half height servers and full height servers will fall within the scope of the present disclosure. The IHS enclosure 200 also includes a connection plane 208 such as, for example, a midplane or a backplane, that is housed in the chassis 202 and that is operable to interconnect the IHSs 206 with I/O switching modules, as discussed in further detail below. The IHS enclosure 200 may include a variety of other components such as, for example, a chassis management controller, circuit boards, connections, power supplies, storage devices, and/or other components known in the art, but those components have not been illustrated and will not be detailed below for clarity of discussion.

Figure 3:
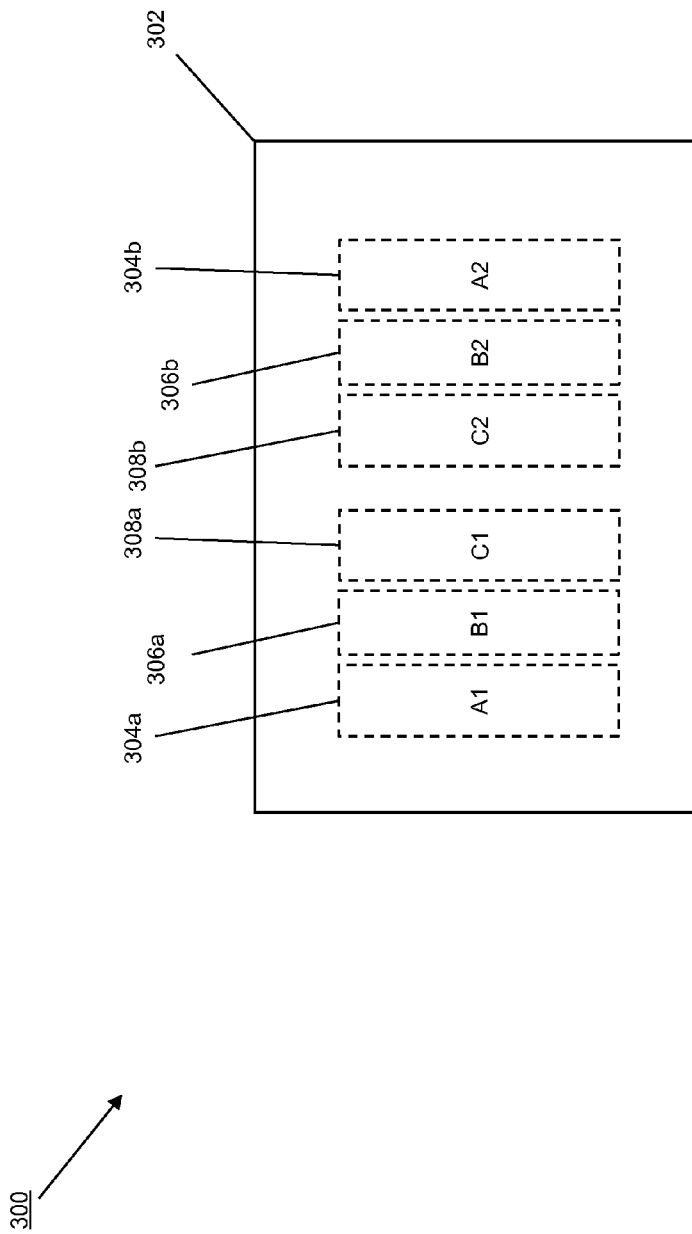
FIG. 3 is a front view illustrating an embodiment of a connection plane in the IHS enclosure of FIG. 2.

Referring now to FIG. 3, and embodiment of a connection plane 300 is illustrated. The connection plane 300 may be the connection plane 208 discussed above with reference to FIG. 2, and thus may be a midplane or backplane that includes interconnects for coupling a plurality of IHSs (e.g., the IHSs 206 discussed above with reference to FIG. 2) to a plurality of input/output (I/O) switching modules. In the illustrated embodiment, a plurality of I/O switching module slots, illustrated by dashed lines, include a first I/O switching module slot 304a (also indicated in the drawing as I/O switching module slot A1), a second I/O switching module slot 304b (also indicated in the drawing as I/O switching module slot A2), a third I/O switching module slot 306a (also indicated in the drawing as I/O switching module slot B1), a fourth I/O switching module slot 306b (also indicated in the drawing as I/O switching module slot B2), a fifth I/O switching module slot 308a (also indicated in the drawing as I/O switching module slot C1), and a sixth I/O switching module slot 308b (also indicated in the drawing as I/O switching module slot C2). In an embodiment, the connection plane 300 includes a circuit board providing connections between each of the I/O switching module slots 304a, 304b, 306a, 306b, 308a, and 308b and a plurality of IHS slots, as discussed in further detail below. Furthermore, the connection plane 300 may include a variety of other interconnects and/or other components known in the art, but those components have not been illustrated and will not be detailed below for clarity of discussion.

Figure 4:
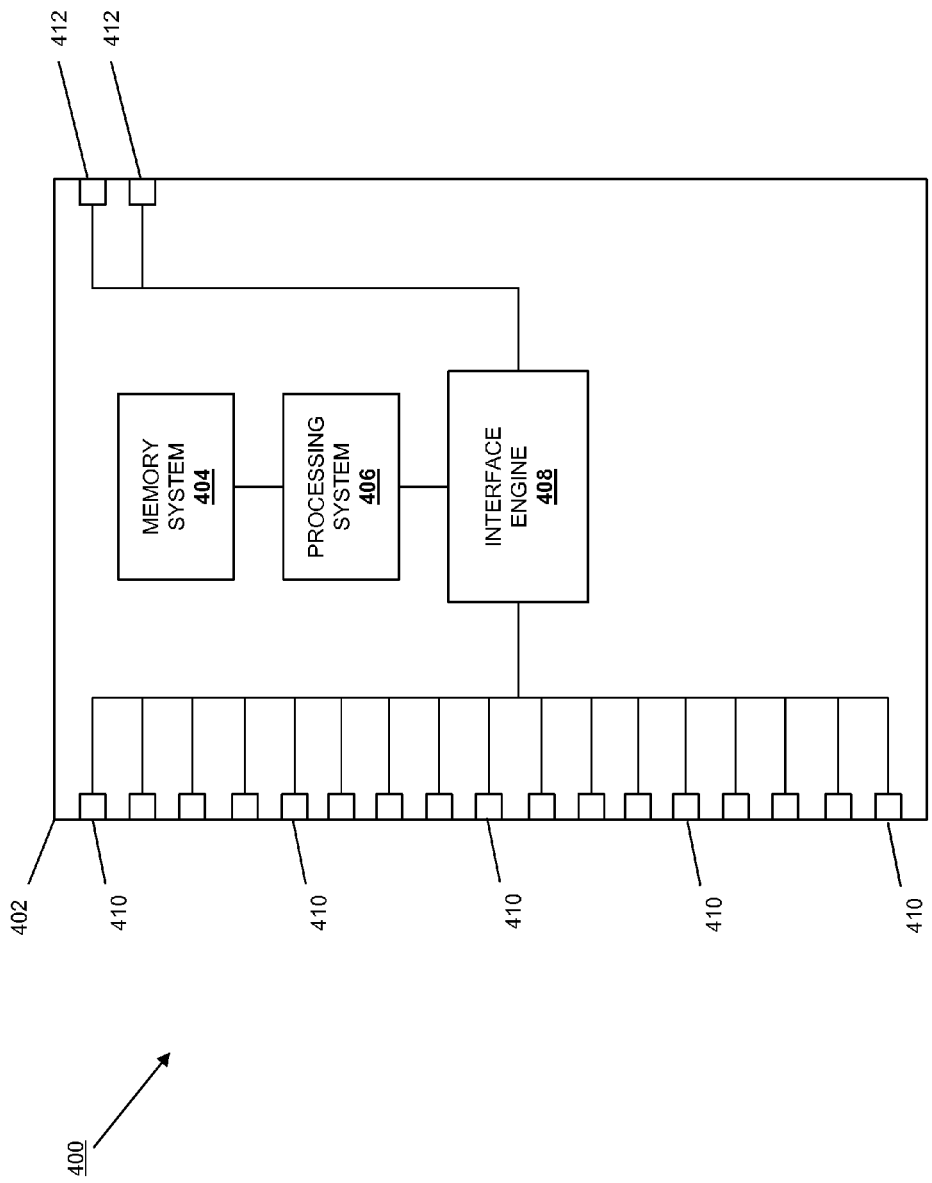
FIG. 4 is a schematic view illustrating an embodiment of an I/O switching module.

Referring now to FIG. 4, an embodiment of an I/O switching module 400 is illustrated. In an embodiment, the I/O switching module 400 may include some or all of the components of the IHS 100, discussed above with reference to FIG. 1. The I/O switching module 400 of the illustrated embodiment includes a chassis 402 that houses a memory system 404 which may be, for example, the storage device 108 or system memory 114 discussed above with reference to FIG. 1. The I/O switching module 400 of the illustrated embodiment also houses a processing system 406 that is coupled to the memory system 404 and that may include, for example, the processor 102 discussed above with reference to FIG. 1. In an embodiment, the memory system 404 is a non-transitory, computer-readable medium that includes instruction that, when executed by the processing system 406, cause the processing system to provide an interface engine 408 that operates to perform some or all of the functions discussed below with regard to the method 700. The interface engine 408 is coupled to a plurality of internal interfaces 410 and a plurality of external interfaces 412 on the I/O switching module 400 through the physical coupling of the processing system 406 to the plurality of internal interfaces 410 and the plurality of external interfaces 412. In an embodiment, the internal interfaces 410 on the I/O switching module 400 may be 10G interfaces, while the external interfaces 412 on the I/O switching module 400 may be 40G interfaces.

Figure 5:
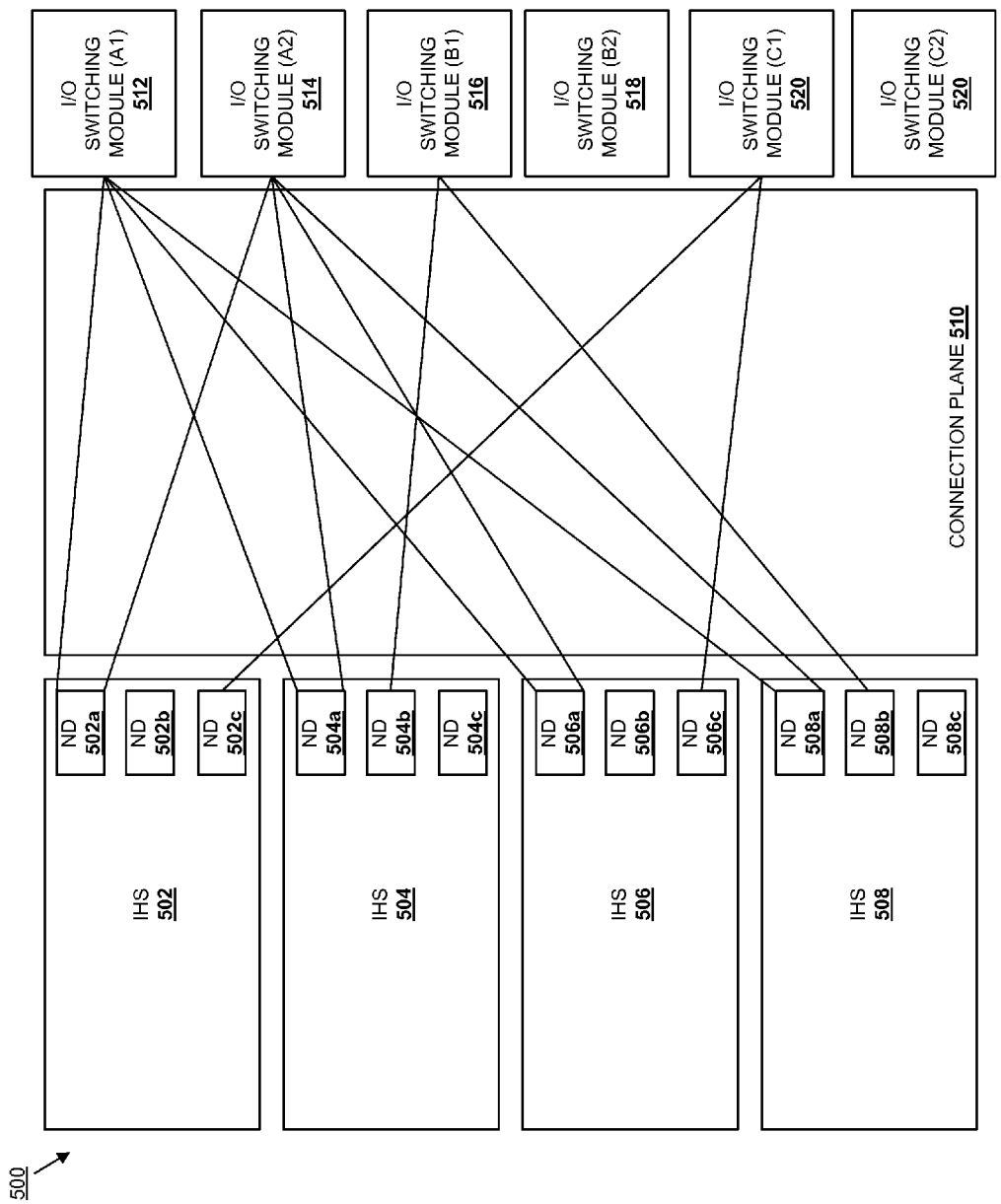
FIG. 5 is a schematic view of an embodiment of a plurality of IHSs coupled to a plurality of I/O switching modules in an IHS enclosure.

Referring now to FIG. 5, an embodiment of an IHS enclosure 500 that illustrates the coupling of IHSs (in IHS slots) to I/O switching modules (in I/O switching module slots) is provided. In the illustrated embodiment of the IHS enclosure 500, a plurality of IHSs 502, 504, 506, and 508 are provided. Each of the IHSs 502, 504, 506, and 508 may be located in an IHS slot provided by an IHS enclosure (e.g., located in the IHS slots 204 provided by the IHS enclosure 200.) Each IHS 502, 504, 506, and 508 includes a plurality of network devices (e.g., network devices 502a, 502b, and 502c for IHS 502; network devices 504a, 504b, and 504c for IHS 504; network devices 506a, 506b, and 506c for IHS 506; and network devices 508a, 508b, and 508c for IHS 508). In an embodiment, the network devices may be Local Area Network (LAN) on Motherboard (LOM) network devices, Mezzanine cards, and/or a variety of other network devices known in the art. A connection plane 510, which may be the connections plane 208 discussed above with reference to FIG. 2 or the connection plane 300 discussed above with reference to FIG. 3, includes interconnects between IHS slots and I/O switching module slots such that the connection plane is operable to provide interconnects between the IHSs 502, 504, 506, and 508 and a plurality of I/O switching modules 512, 514, 516, 518, 520, and 522 in the I/O switching module slots.

Specifically, the connection plane 510 connects the IHS 502 to the I/O switching modules 512, 514, and 520 by providing interconnects between the network device 502a and internal interfaces on the I/O switching modules 512 and 514 (e.g., an internal interface 410 on the I/O switching module 400), and by providing interconnects between the network device 502c and an internal interface on the I/O switching module 520 (e.g., an internal interface 410 on the I/O switching module 400). Similarly, the connection plane 510 connects the IHS 504 to the I/O switching modules 512, 514, and 516 by providing interconnects between the network device 504a and internal interfaces on the I/O switching modules 512 and 514, and by providing interconnects between the network device 504b and an internal interface on the I/O switching module 516. Similarly, the connection plane 510 connects the IHS 506 to the I/O switching modules 512, 514, and 520 by providing interconnects between internal interfaces on the network device 506a and the I/O switching modules 512 and 514, and by providing interconnects between the network device 506c and an internal interface on the I/O switching module 520. Similarly, the connection plane 510 connects the IHS 508 to the I/O switching modules 512, 514, and 516 by providing interconnects between the network device 508a and internal interfaces on the I/O switching modules 512 and 514, and by providing interconnects between the network device 508b and an internal interface on the I/O switching module 516.

The illustrated embodiment of FIG. 5 provides an example of the interconnections provided between a plurality of quarter height servers and a plurality of I/O switching modules. With reference to FIG. 2, one of skill in the art will recognize that the embodiment illustrated in FIG. 5 details the interconnects provided for a single column of the IHSs 206 (quarter-height servers) in the IHS enclosure 200 to I/O switching modules in the IHS enclosure 200. Furthermore, one of skill in the art will recognize that the connection plane 510 may provide different interconnects for each column of IHSs 206 in the IHS enclosure 200. As is known in the art, a server IHS may include 6 ports, each of which can be connected to one of the six I/O switching modules in the IHS enclosure. In the illustrated example, each of the I/O switching modules 512 and 514 may include 32 internal interfaces or ports, and the connection plane 510 may provide an interconnect between each of the quarter height server IHSs 206 in the IHS enclosure 200 and the I/O switching modules 512 and 514. Similarly, the connection plane 510 may provide interconnects between two rows of the quarter height server IHSs 206 and 16 internal interfaces or ports on the I/O switching module 516, while also providing interconnects between two other rows of the quarter height server IHSs 206 and 16 internal interfaces or ports on the I/O switching module 518.

Figure 6:
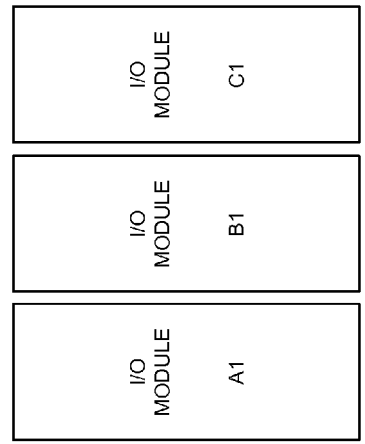
FIG. 6 is a schematic view illustrating an embodiment of the interconnections between a plurality of server IHSs and a plurality of I/O switching modules.

An example of the interconnects discussed above is provided in the IHS enclosure connection diagram 600 illustrated in FIG. 6. The diagram 600 illustrates the connection of 32 quarter height server IHSs housed in a server IHS enclosure and coupled to ports on 4 of 6 available I/O modules through a connection plane (not illustrated.) The quarter height server IHSs are referenced based on their position in one of eight columns labeled 1, 2, 3, 4, 5, 6, 7, and 8; and one of four rows labeled A, B, C, and D (e.g., the server IHS in column 1 and row A is server IHS 1A). The diagram 600 details the interconnects provided by the connection plane between the server IHSs and the I/O switching modules. For example, server IHS 1A is connected to port 1 on the I/O switching module A1, port 17 on the I/O switching module A2, and port 1 on the I/O switching module C1. The information in the diagram that details the interconnections between the server IHSs and the I/O switching modules (or more particularly, the interconnects provided by the connection plane between the IHS slots and the I/O switching module slots) may be stored in the memory system of the I/O switching modules (e.g., the memory system 404 of the I/O switching module 400 discussed above with reference to FIG. 4.) While a specific example of interconnects between quarter height server IHSs and I/O switching modules has been provided, one of skill in the art will realize those interconnects will change when different IHSs are used in the IHS enclosure (e.g., when half height server IHSs, full height server IHSs, and/or combinations thereof are used.) Thus, the memory systems I/O switching modules may include interconnect information, or interconnect may be retrieved by an I/O switching module (e.g., from a chassis management controller, over a network, etc.) and stored in the memory system, for a plurality of different interconnect scenarios (e.g., such as two half height server IHSs in column 1, a full height server IHS in column 2, etc.) Furthermore, dynamic interconnect assignment between IHSs and I/O switching modules may be performed by a chassis management controller and then communicated by the chassis management controller to the I/O switching modules during the method 700.

Figure 7:
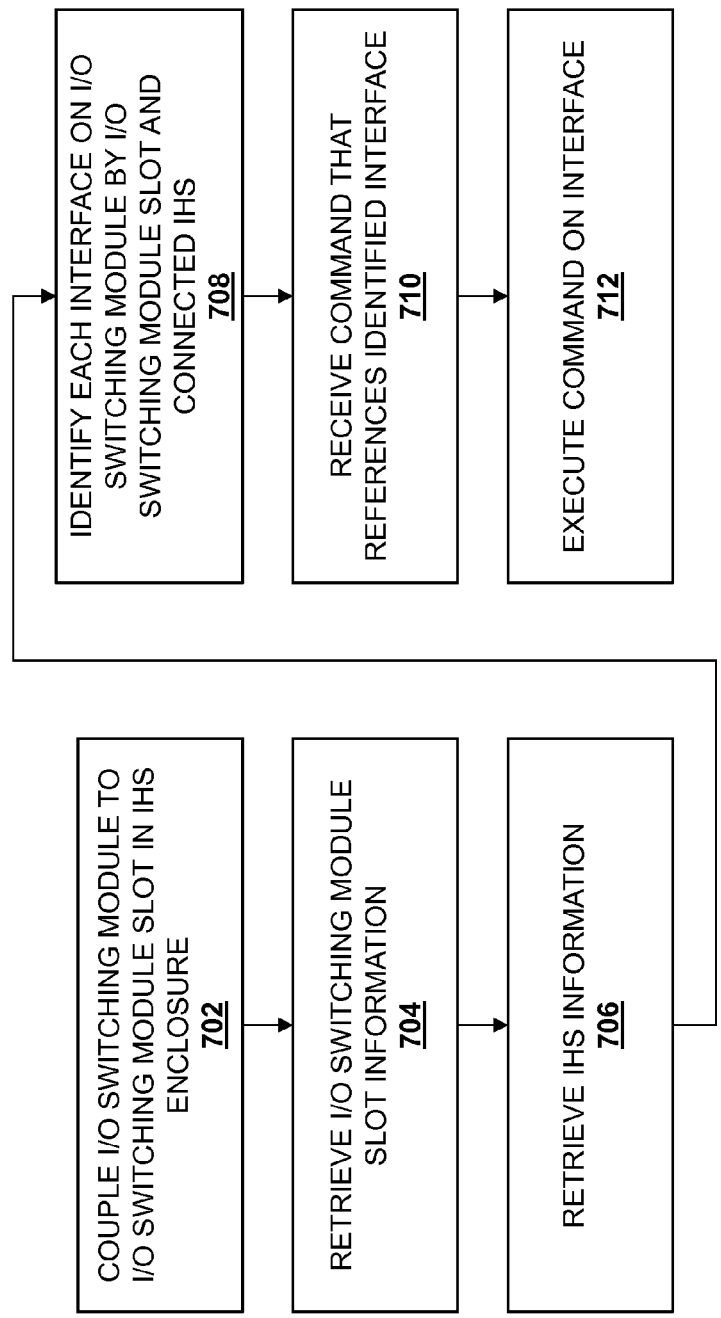
FIG. 7 is a flow chart illustrating an embodiment of a method for identifying interfaces.

Referring now to FIG. 7, an embodiment of a method 700 for identifying interfaces is provided. The method 700 provides for I/O switching module awareness of both the I/O switching module slot and the IHSs to which it is connected in an IHS enclosure, which allows the I/O switching module to identify each of its internal interfaces by the I/O switching module slot to which it is connected, and by the IHS which is connected to that internal interface. Furthermore, this allows the I/O switching module to receive commands that reference an IHS, and interpret those commands to be directed to an internal interface on the I/O switching module. The method 700 discussed below assumes the connection of a plurality of IHSs in an IHS enclosure (e.g., the IHSs 206 in the IHS slots 204 of the IHS enclosure 200) prior to the method 700 beginning, but one of skill in the art will recognize that IHSs may be added to the IHS enclosure during the method 700 as well. The method 700 begins at block 702 where an I/O switching module is coupled to an IHS switching module slot in the IHS enclosure. For example, with reference to FIGS. 3, 5, and 6, the an I/O switching module may be coupled to the I/O switching module slot A1. As discussed above, the connection plane in the IHS enclosure interconnects IHS slots in the IHS enclosure with I/O switching module slots in the IHS enclosure, and the coupling of the I/O switching module to the I/O switching module slot at block 702 couples the I/O switching module to those interconnects to couple that I/O switching module to one or more IHSs that are coupled to those interconnects.

The method 700 then proceeds to block 704 where I/O switching module slot information is retrieved. In an embodiment, after the connection of the I/O switching module to an I/O switching module slot in the IHS enclosure, the I/O switching module may be started up, booted, other otherwise initiated and, in response, the I/O switching module will retrieve I/O switching module slot information that details which of the I/O switching module slots in the IHS enclosure it is coupled to (e.g., I/O switching module slot information that details that the I/O switching module was coupled to I/O switching module slot A1 in block 702 of the method 700.) In an embodiment, the I/O switching module may retrieve the I/O switching module slot information through hardware by accessing a register in the connection plane that indicates which I/O switching module slot the I/O switching module was coupled to at block 702. In an embodiment, the I/O switching module may retrieve the I/O switching module slot information from a chassis management controller (e.g., included in the IHS enclosure) through communication via Extensible Markup Language (XML) from the chassis management controller to the I/O switching module that indicates which I/O switching module slot the I/O switching module was coupled to at block 702. In an embodiment, the I/O switching module may retrieve the I/O switching module slot information from a chassis management controller (e.g., included in the IHS enclosure) through a doorbell mechanism provided by the chassis management controller to the I/O switching module that indicates which I/O switching module slot the I/O switching module was coupled to at block 702. While a few examples of the retrieval of the I/O switching module slot information have been provided, one of skill in the art will recognize that I/O switching module slot information may be retrieved by the I/O switching module using a variety of other mechanisms known in the art while remaining within the scope of the present disclosure.

The method 700 then proceeds to block 706 where IHS information is retrieved. As discussed above, after the connection of the I/O switching module to an I/O switching module slot in the IHS enclosure, the I/O switching module may be started up, booted, other otherwise initiated. In response, the I/O switching module may also retrieve IHS information that details information about the IHSs in the IHS slots of the IHS enclosure that are coupled to the I/O switching module (e.g., whether the IHSs coupled to the IHS switching module are quarter height, half height, or full height server IHSs.) In an embodiment, the I/O switching module may retrieve the IHS information from a chassis management controller (e.g., included in the IHS enclosure) through communication via Extensible Markup Language (XML) from the chassis management controller to the I/O switching module that indicates the details about the IHSs coupled to the I/O switching module. In an embodiment, the I/O switching module may retrieve the IHS information from a chassis management controller (e.g., included in the IHS enclosure) through a doorbell mechanism provided by the chassis management controller to the I/O switching module that indicates the details about the IHSs coupled to the I/O switching module. While a few examples of the retrieval of the IHS information have been provided, one of skill in the art will recognize that IHS information may be retrieved by the I/O switching module using a variety of other mechanisms known in the art while remaining within the scope of the present disclosure.

The method 700 then proceeds to block 708 where each interface on the I/O switching module is identified by an I/O switching module slot and a connected IHS. In an embodiment, each I/O switching module in the IHS enclosure may use the I/O switching module slot information, the IHS information, and the connection plane interconnect information (e.g., stored in the memory system of the I/O switching module, retrieved from a chassis management controller, etc.) to identify each of the internal interfaces on the I/O switching module. Conventionally, I/O switching modules identify their internal interface generically. For example, a conventional I/O switching module with internal 10G interfaces or ports will identify those ports generically as Tengig 0/1, Tengig 0/2, and so on. However, the I/O switching modules of the present disclosure use the I/O switching module slot information, the IHS information, and the connection plane interconnect information to identify each of their internal interfaces by the I/O switching module slot to which they are connected and the IHS connected to that interface. For example, referring to the diagram 600 in FIG. 6, the I/O switching module connected to I/O switching module slot A1 may use the I/O switching module slot information to determine that it is connected to I/O switching module slot A1, and use the IHS information to determine that the server IHS in slot 1 of the IHS enclosure (e.g., the server IHS 1A) is a quarter height server. Using the interconnect information, the I/O switching module may determine that a quarter height server in slot 1 of the IHS enclosure is interconnected with port 1 on the I/O switching module in the I/O switching module slot A1. With this information, the I/O switching module may then identify its internal interface port 1 (assuming this internal interface is a 10G interface) as Tengig 0/serv1A/A1. Thus, rather than using a generic interface identification for internal interface port 1 (e.g., Tengig0/1), the internal interface port 1 may be identified by the IHS connected to that internal interface, as well as the I/O switching module slot that includes that interface (e.g., Tengig 0/serv1A/A1).

Similarly, with reference to FIG. 6, the I/O switching module in I/O switching module slot A2 may identify its internal interface port 30 (assuming this internal interface is a 10G interface) as Tengig 0/serv6C/A2. Similarly, the I/O switching module in I/O switching module slot B1 may identify its internal interface port 8 (assuming this internal interface is a 10G interface) as Tengig 0/serv8B/B1. Similarly, the I/O switching module in I/O switching module slot C1 may identify its internal interface port 12 (assuming this internal interface is a 10G interface) as Tengig 0/serv4C/C1. Thus, one of skill in the art will recognize that each of the internal interfaces on each of the I/O switching modules may be identified by the IHS coupled to that internal interface and the I/O switching module slot that that I/O switching module is coupled to.

The method 700 may then proceed to block 710 where a command is received that references an identified interface, and then to block 712 where that command is executed on the referenced identified interface. At block 710, a user may send a configuration command to one or more I/O switching modules that references identified interface ports on those I/O switching modules. In an embodiment, a user may wish to configure all ports connected to a server IHS or a server IHS slot by giving a configuration command that references the server slot or server number in the command. For example, with reference to FIG. 6, a user may send a configuration command to the I/O switching module in I/O switching module slot A1 that instructs that I/O switching module to configure the port connected to server 1A by referencing that server and that I/O switching module slot through a command such as "Configure tengig 0/serv1A/A1", which would result, at block 712, in the I/O switching module in I/O switching module slot A1 configuring its internal interface port 1 (according to the interconnects as detailed in FIG. 6.) Similarly, a user may send an interface range configuration command to the I/O switching module in I/O switching module slot A1 that instructs that I/O switching module to apply a set of configurations to a range of ports connected to servers in column 1 of the IHS enclosure by referencing that column through a command such as "Interface Range tengig 0/serv1", which would result, at block 712, in the I/O switching module in I/O switching module slot A1 configuring the internal interface ports 1, 9, 17, and 25 on the I/O switching module (according to the interconnects as detailed in FIG. 6.)

Thus, systems and methods have been described that provide for I/O switching module slot and server IHS awareness by an I/O switching module, which allows for the I/O switching modules to identify internal interfaces on the I/O switching module by the server IHS that is connected to that interface and the I/O switching module slot to which that I/O switching module is coupled. These interface identifications may then be used for configuration commands, interface range configuration commands, as well as to show command outputs (e.g., "show interface <x/y/z>" to display the status, packet counters, and configuration applied on an interface), and one of skill in the art will recognize that the use of such interface identifications by a user greatly simplifies the configuration of a specific port or ports on an I/O switching module that are connected to a particular server or servers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An interface identification system, comprising:
   an information handling system (IHS) enclosure including a plurality of IHS slots and a plurality of input/output (I/O) switching module slots;
   a connection plane providing interconnects between the plurality of IHS slots and the plurality of I/O switching module slots; and
   an I/O switching module that includes a plurality of interfaces and access to a memory that stores interconnect information about the interconnects provided between the plurality of IHS slots and the urali of I/O switchin module slots by the connection plane, wherein the I/O switching module is configured to be coupled to a first I/O switching module slot of the plurality of I/O switching module slots and, in response:
   retrieve first I/O switching module slot information about the first I/O switching module slot;
   retrieve IHS information about one or more IHSs located in the plurality of IHS slots that are interconnected with the first I/O switching module slot through the connection plane;
   retrieve the interconnect information from the memory; and
   use the first I/O switching module slot information, the IHS information, and the interconnect information to identify each of the plurality of interfaces on the I/O switching module that is coupled to an IHS by that IHS and the first I/O switching module slot.

2. The system of claim 1, wherein the I/O switching module is configured to retrieve the first I/O switching module slot information from a chassis management controller.

3. The system of claim 1, wherein the I/O switching module is configured to retrieve the IHS information from a chassis management controller.

4. The system of claim 1, wherein the I/O switching module is configured to receive a command that references an identified interface by an IHS connected to the identified interface and, in response, execute the command on the identified interface.

5. The system of claim 4, wherein the command references the identified interface by the first I/O switching module slot that is coupled to the I/O switching module that includes the identified interface, along with the IHS connected to the identified interface.

6. The system of claim 4, wherein the command is a configuration command.

7. A multi-server system, comprising:
   a server enclosure;
   a plurality of servers housed in the server enclosure and coupled to a connection plane that interconnects each of the plurality of servers with at least one input/output (I/O) switching module slot; and
   an I/O switching module that includes access to a memory that stores interconnect information about the interconnects provided between the plurality of servers and the at least one I/O switching module slot by the connection plane, wherein the I/O switching module is configured, in response to being coupled to a first I/O module slot of the plurality of I/O module slots, to:
   recognize the first I/O switching module slot and determine which of the plurality of servers are coupled to the first I/O switching module slot; and
   use the stored interconnect information to identify each of a plurality of interfaces on the I/O switching module that is coupled to a server by that server and the first I/O switching module slot.

8. The system of claim 7, wherein the I/O switching module is configured to recognize the first I/O switching module slot in response to communication with a chassis management controller.

9. The system of claim 7, wherein the I/O switching module is configured to determine which of the plurality of servers are coupled to the first I/O switching module slot in response to communication with a chassis management controller.

10. The system of claim 7, wherein the I/O switching module is configured to receive a command that references an identified interface by a server connected to the identified interface and, in response, execute the command on the identified interface.

11. The system of claim 10, wherein the command references the identified interface by the first I/O switching module slot that is coupled to the I/O switching module that includes the identified interface, along the server connected to the identified interface.

12. The system of claim 10, wherein the command is a configuration command.

13. A method for identifying interfaces, comprising:
   coupling an input/output (I/O) switching module to a first I/O switching module slot of a plurality of I/O switching module slots in an information handling system (IHS) enclosure;
   retrieving, by the I/O switching module, first I/O switching module slot information about the first I/O switching module slot;
   retrieving IHS information about one or more IHSs located in a plurality of IHS slots that are located in the IHS enclosure and that are interconnected with the first I/O switching module slot;
   retrieving, from memory, interconnect information about the interconnects provided between the plurality of IHS slots and the plurality of I/O switching module slots; and
   using the first I/O switching module slot information, the IHS information, and the interconnect information to identify each of the plurality of interfaces on the I/O switching module that is coupled to an IHS by that IHS and the first I/O switching module slot.

14. The method of claim 13, wherein the I/O switching module retrieves the first I/O switching module slot information from a chassis management controller.

15. The method of claim 13, wherein the I/O switching module retrieves the IHS information from a chassis management controller.

16. The method of claim 13, further comprising:
   receiving a command that references an identified interface by an IHS connected to the identified interface and, in response, executing the command on the identified interface.

17. The method of claim 13, wherein the command references the identified interface by the first I/O switching module slot that is coupled to the I/O switching module that includes the identified interface, along the IHS connected to the identified interface.

* * * * *